March 29, 1966  E. J. MIZMA  3,242,947
PNEUMATIC PULSATION DAMPENER
Filed Nov. 12, 1963
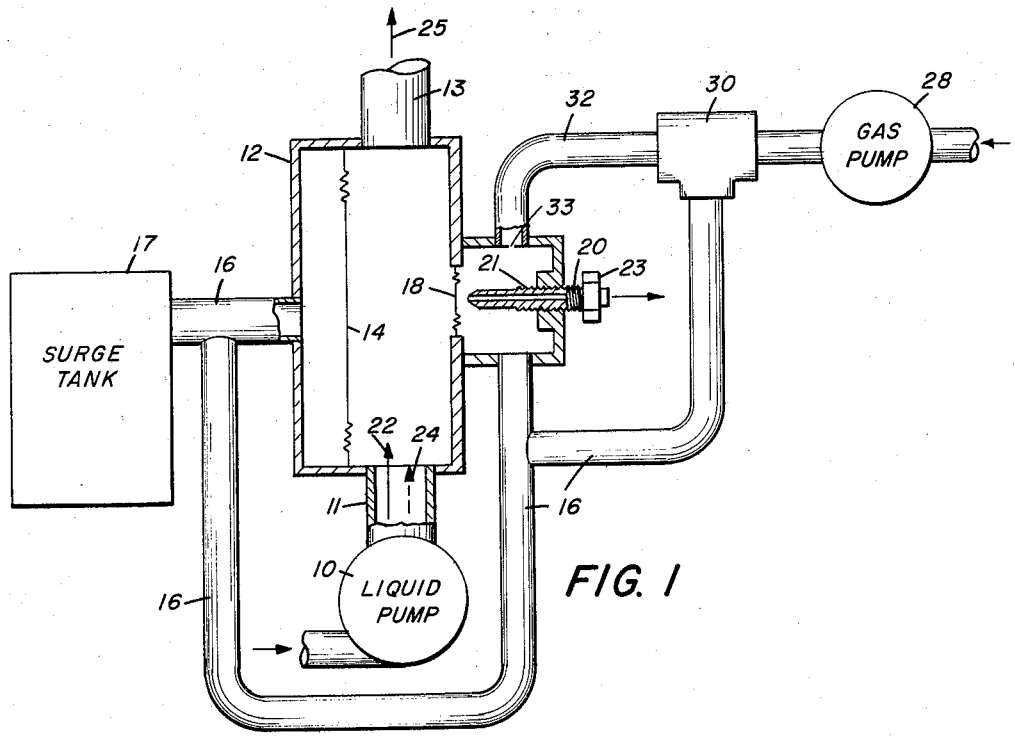
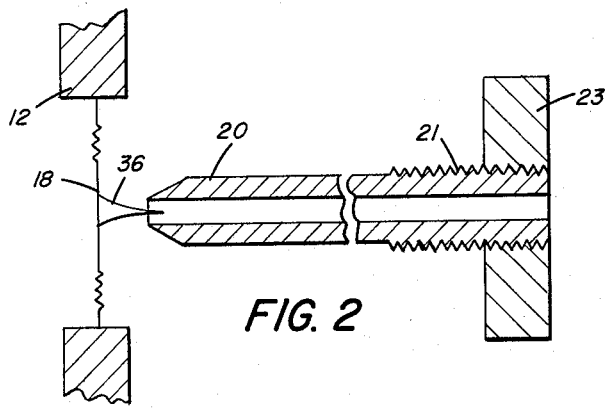
EDWARD J. MIZMA
INVENTOR.
BY R Frank Smith
David P. Ogden
ATTORNEYS

United States Patent Office 3,242,947
Patented Mar. 29, 1966

3,242,947
PNEUMATIC PULSATION DAMPENER
Edward J. Mizma, Rochester, N.Y., assignor to Eastman Kodak Company, Rochester, N.Y., a corporation of New Jersey
Filed Nov. 12, 1963, Ser. No. 322,931
8 Claims. (Cl. 138—30)

The present invention relates to a pneumatic pulsation dampener and more particularly to a pneumatic pulsation dampener having feed-back signal means whereby pressure variations of long duration will not be compensated for by continued deflection of a diaphragm while abrupt pressure variations of short duration will be dampened by such deflection.

In the art of pulsation dampeners, many different arrangements are well known and work along the principle of having an expansion chamber partially filled with a compressible fluid such as air and coupled, usually by a flexible diaphragm, to a conduit system containing a noncompressible fluid such as water. These arrangements are often used in household plumbing to prevent knocking of the pipes and in various process equipments to prevent surge fluctuations of fluid flow. In known arrangements, the diaphragm usually takes a position depending on its flexibility and the relative pressures in the compressible and noncompressible fluids impinging thereon. With such a device, the gas is usually compressed to a static level substantially above atmospheric pressure whereby the pressure within the noncompressible fluid conduit system may be maintained at any level facilitating feasible flow rates without substantial deflection of the diaphragm.

In such a device, should there develop a leak in the compressible gas fluid system, the flexible diaphragm is required to carry the full pressure differential between the noncompressible fluid and atmospheric pressure. Although many flexible materials are capable of doing this even at elevated pressures, requiring sufficient strength for them to accomplish such containment of the noncompressible fluid greatly reduces their flexibility and ability to assimilate abrupt surges in the fluid system.

Because this approach seems to be rather completely accepted in this art, there has been a long need for arrangements which will both safely contain relatively high pressures yet provide substantially improved flexibility of the shock absorbing components and the pressure levels of operation. For instance, with fluids being used in certain manufacturing processes, it is requisite that the fluid flow rate be maintained substantially uniform. In such a process, surges will result in uneven flow rates and waviness or similar defects which produce unacceptable finished products. Reliance on stiff diaphragm expansion means will not readily compensate for surges normal to such a process because of pumping means, changing of flow patterns, and the like problems which cause sharp deviations of small magnitude. At the same time it is often necessary to change flow rates with changes of process or to change fluid characteristics whereby a most acceptable pneumatic pulsation dampener arrangement must be capable of maintaining its flexibility at substantially different pressure levels.

Therefore, an object of the present invention is to provide a novel and reliable pneumatic pulsation dampener arrangement.

A further object is to provide a pulsation dampener having a compressible fluid of selectively variable pressures continuously engaging an outer surface of a diaphragm arranged to co-operate therewith to contain a noncompressible fluid to maintain in the flexible diaphragm enough flexibility to reduce to a minimum abrupt pressure fluctuations in the noncompressible fluid at different pressure levels.

In accordance with one embodiment of my invention, a liquid pump drives a noncompressible fluid through a conduit system including a diaphragm chamber provided with a large soft diaphragm for absorbing abrupt pressure fluctuations and a smaller pilot diaphragm arranged to regulate the pressure of a compressible fluid, usually a gas such as air, used to maintain a neutral or "normal" location of the diaphragms of the diaphragm chamber. A suitable capacity gas storage system is coupled to the large diaphragm to allow substantial motion thereof without greatly affecting pressure of the compressible gas system during such flexing. A bleeder nozzle is provided adjacent to and coaxial with the pilot diaphragm whereby the flexing of the pilot diaphragm controls the escape of compressible fluid from the nozzle. In accordance with one embodiment, the steady state pressure range is extended by the compressible gas being supplied through a pneumatic relay and an orifice arranged so that in steady state operation, equal amounts of air pass through the orifice and the bleeder nozzle. The pneumatic relay regulates the rate at which gas is supplied to the compressible fluid system and is in turn regulated by the static pressure of this system.

The subject matter which is regarded as my invention is particularly pointed out and distinctly claimed in the concluding portion of the specification. The invention, however, as to its organization and operation, together with further objects and advantages thereof, will best be understood by reference to the following description taken in connection with the accompanying drawing in which:

FIG. 1 is a schematic view partially in section of one embodiment of my invention; and FIG. 2 is a detail sectional view of a pilot diaphragm arrangement usable with my invention.

Referring now to the drawing, wherein like numbers refer to similar parts, in FIG. 1, I have shown a liquid pump 10 for pumping fluid of a substantially noncompressible type such as water through a liquid conduit system indicated at 11 coupled to a diaphragm pressure chamber 12 having an output liquid conduit system 13. Within the chamber 12 is a large and flexible main diaphragm 14 engaged on one side thereof by the liquid and engaged on the other side thereof by a compressible fluid such as air which is coupled by a gas conduit system 16 to a surge tank 17 and a pilot diaphragm 18. Depending upon the relative liquid and gas conduit system capacity requirements the surge tank 17 may be omitted in processes where abrupt changes of flow in the liquid system 11 are relatively small. The use of a small pump to supply a single production line process could easily be so designated. However, the use of a large pump to supply liquid selectively or concurrently to several production lines will usually require such surge tank 17.

The pilot diaphragm 18 is also coupled to the liquid within the chamber 12 and on the side thereof exposed to the gas conduit system 16 has coaxial therewith a bleeder nozzle 20. One orifice plug assembly suitable for this use is No. 7696 marketed by Taylor Instrument Company. As is apparent in FIG. 1, the adjacent end of the bleeder nozzle is in close proximity with the pilot diaphragm 18 and its location is adjustable by means of threading 21. Once the nozzle 20 is properly positioned for a particular liquid pressure, it is locked in place by a lock nut 23. Also this adjustment may be used to compensate for any leaks of the gas conduit system 16, or the surge tank 17 if such leaks are large enough to tend to change neutral positions of the diaphragms.

As in normal operation of a pumped liquid, the input liquid pressure varies between a maximum value as indicated by a solid arrow 22 and a minimum value as indicated by a dashed arrow 24. These arrows 22 and 24 represent the typical variable pressure range within the liquid conduit system 11. This variation is dependent upon the particular portion of the cycle of operation of the liquid pump 10 as well as whether or not additional utilization equipment is being coupled to the output conduit system 13. On the downstream side of the chamber 12 a single arrow 25 indicates the steady pressure within the output conduit system 13 as accomplished by flexing of the soft main diaphragm 14.

The neutral position of the diaphragms, as indicated in FIG. 1 is maintained by a balance of pressures thereacross. The inner surface of the diaphragms is engaged by a process liquid and the outer side by a compressible fluid such as air. Both of these fluids are maintained at about the same pressure such as 80 p.s.i. Air is supplied to the gas conduit system 16 by a gas pump 28 through a pneumatic relay 30 and an input conduit 32 to an orifice 33 coupled directly to the region of the bleeder nozzle 20 and the pilot diaphragm 18. Thus pressure fluctuations which might be developed in the gas conduit system 16 because of the operation of the gas pump 28 or other upstream system apparatus is relatively remote from the main diaphragm 14 and tends not to influence the flow of liquid within the output conduit system 13. The pneumatic relay 30 is coupled to the input conduit 32 and thereby regulates the flow of air to the gas conduit system 16 in accordance with the pressure of the gas conduit system 16. The pneumatic relay 30 operates to extend the static pressure range of automatic operation of the dampener system by maintaining a constant pressure drop, e.g. 10 p.s.i., across the orifice 33. Thus one embodiment of my invention may be used to regulate flow of liquids of substantially different consistencies and substantially different flow rates, both of these parameters resulting in substantially different average static pressures.

By way of example, if the pressure in the chamber 12 increases sharply both of the diaphragms 14 and 18 are deflected outwardly. The deflection of the diaphragm 14 causes a slight increase in the pressure of the surge tank 17. Moreover, the pilot diaphragm 18 is deflected toward the bleeder nozzle 20 and thereby partially restricts flow of air therefrom. If the increased pressure continues for an extended period, during this period when the pilot diaphragm 18 is so deflected more gas flows into the system through the orifice 33 than is exhausted therefrom through the bleeder nozzle 20. As a result, the pressure of the gas conduit system 16 increases, depending upon the effective area of and pressure drop across the orifice 33, to restrain the diaphragms 14 and 18 and return them toward their normal positions. In one equipment using my invention this recovery rate is about one second for about five percent liquid pressure changes from normal pressures of about 80 p.s.i.

At the same time the air pressure is increased in the gas conduit system 16, the pressure thereof which is applied to control the pneumatic relay 30 is similarly increased to increase the pressure at which the air is supplied through the input conduit 32 whereby the system may now operate at a higher pressure but with the diaphragms at their neutral positions whereby the maximum flexibility is restored. One suitable relay 30 arranged to provide a constant 10 p.s.i. pressure drop across the orifice 33 is marketed by Taylor Instrument Co. as No. 41S480.

Referring again to FIG. 1, should the pressure of the liquid decrease for an extended period, an opposite result occurs. Air from within the gas conduit system 16 impinging upon the main diaphragm 14, causes it to be deflected inward and deflects the pilot diaphragm 18 inward also. This allows an increase in the escape of air from the bleeder nozzle 20 whereby air escapes at a rate greater than it is being received through the orifice 33. Thus, again the diaphragms move toward their normal positions.

If the lower pressure is maintained for a substantial period, the pressure of the gas conduit system 16 decreases, whereby the pneumatic relay 30 reduces the pressure within the input conduit 32 and the system adjusts to a new pressure level of operation but with the diaphragms at their neutral positions whereby their maximum flexibility is again restored.

Referring now to FIG. 2, I have shown in detail a simple arrangement for restricting the flow through the bleeder nozzle 20. On the pilot diaphragm 18, and coaxial with the central aperture of the bleeder nozzle 20 is a generally conical plug 36 which is arranged to restrict the aperture in accordance with the position of the pilot diaphragm 18. Also shown more clearly in FIG. 2 is the threading 21 on the bleeder nozzle 20 which allows adjustment of the pressures of the gas conduit system 16 and thereby regulates the normal position of the pilot diaphragm 18 and concurrently the main diaphragm 14.

Such an adjustment is most useful if I intend to change from relatively low pressure operation such as 40 p.s.i. to high pressure operation such as 100 p.s.i. while keeping the diaphragms at their most flexible neutral location. Moreover, the contour of the plug 36 may be designed by methods known in the fluid art to provide lineal or some other functional restriction of flow rates in accordance with the displacement of the pilot diaphragm 18.

During one use of my invention, the main diaphragm was displaced a major portion of an inch with pressure fluctuations that displaced the pilot diaphragm only a small fraction of an inch. Thus the relationship between the pilot diaphragm 18 and the nozzle 20 may be such that in normal static positions the nozzle flow is about 50% capacity because of the turbulence etc., caused by the diaphragm 18. At a very low relative pressure, where the pilot diaphragm 18 moves away from the nozzle 20, the nozzle flow may go as high as 90% capacity and at high pressures where the pilot diaphragm 18 moves toward nozzle 20, the flow may go as low as 10%. Of course as the gas pressure of the gas conduit system approaches the liquid pressure, the diaphragms both return to their neutral positions and the nozzle flow rate returns toward 50% of capacity. Without the pneumatic relay 30, this flow rate may vary between about 35% and 65% nozzle capacity for one particular design. However, the static pressure range was somewhat less than I contemplate may be useful in a particular process. Therefore I prefer to use the relay 30 to provide increased pressure variations with flow variations of only a few percent and similarly small variations of steady state displacement of the diaphragms 14 and 18 to thus allow use of most flexible material. As is apparent from the above discussion, the static pressure of the gas conduit system is always at an average of the recent liquid pressures.

Obviously, the rapidity of the restabilization of the gas pressure to a new level is a function of the overall capacity of the entire gas system compared to the rate of flow of gas through the orifice 33 and the nozzle 20. I prefer to keep the overall capacity comparatively small so that the recovery rate may be rapid with a reasonable flow rate of air through the input conduit 36. In one operation of my invention the gas conduit system stabilized within about two seconds after the liquid pump was in operation. Thus major liquid pressure changes will be compensated for in stabilized gas pressures within about a second or less.

While I have shown and described particular embodiments of the present invention, other modifications may occur to those skilled in the art. For instance, if it is necessary to increase still further the pressure range over which flexibility of the main diaphragm 14 is to be maintained, a pneumatic relay developing a graduated pressure differential may be used to maintain the diaphragms even closer to their neutral positions respectively. An example of such a graduated pressure differential would be 10 p.s.i. drop across the orifice for 80 p.s.i. liquid pressure, 9 p.s.i. drop for 72 p.s.i. liquid pressure, 11 p.s.i. drop for 88 p.s.i. liquid pressure, etc. I intend therefore by the appended claims to cover all such modifications as wall within the true spirit and scope of my invention.

I claim:

1. A pneumatic pulsation dampener for regulating flow of a noncompressible liquid, comprising:
 a conduit for conducting the liquid;
 a main diaphragm having one side exposed to the liquid;
 a pilot diaphragm having one side exposed to the liquid;
 a gas conduit system coupled to the other side of said main diaphragm and said pilot diaphragm;
 a bleeder nozzle adjacent to said pilot diaphragm and arranged to exhaust gas from said conduit system in accordance with the spacing between said pilot diaphragm and the end of said nozzle;
 a gas input conduit; and
 an orifice coupling said input conduit to said conduit system for supplying gas thereto under static conditions at the rate at which it escapes from said nozzle whereby an increase in pressure of the liquid moves said main diaphragm to allow expansion thereof and moves said pilot diaphragm to restrict the gas flow from said nozzle to increase the pressure within said conduit system and return said main diaphragm toward its normal position.

2. A pneumatic pulsation dampener in accordance with claim 1 wherin said pilot diaphragm supports a plug coaxial with the aperture of said nozzle to restrict the flow thereof in accordance with the displacement of said pilot diaphragm.

3. A pneumatic pulsation dampener in accordance with claim 1 wherein the pressure of gas in said input conduit is regulated by a pneumatic relay in accordance with the pressure in said gas conduit system to thereby extend the range of pressures over which the dampener is automatically operable.

4. A pneumatic pulsation dampener for regulating flow of a noncompressible liquid, comprising:
 a conduit for conducting the liquid;
 a main diaphragm having one side exposed to the liquid;
 a pilot diaphragm having one side exposed to the liquid;
 a gas conduit system coupled to the other side of said main diaphragm and said pilot diaphragm;
 a bleeder nozzle coaxial with said pilot diaphragm and arranged to exhaust gas from said conduit system in accordance with the spacing between the center of said pilot diaphragm and the end of said nozzle;
 a gas input conduit;
 an orifice coupling said input conduit to said conduit system for supplying gas thereto at the rate approximating that which it escapes from said nozzle; and
 a pneumatic relay coupled in said input conduit to regulate the flow therethrough and coupled to said conduit system to be regulated thereby, whereby an increase in pressure of the liquid moves said main diaphragm to allow expansion thereof and dampen the pressure pulsation and moves said pilot diaphragm to restrict the gas flow from said nozzle resulting in an increase of the pressure within said conduit system, a change of the regulation of said pneumatic relay and a return of said main diaphragm toward its neutral position to provide maximum flexibility for a next change of pressure.

5. A pneumatic pulsation dampener for regulating flow of a noncompressible liquid, comprising:
 a conduit for conducting the liquid;
 a diaphragm chamber coupled in said conduit;
 a main diaphragm in said chamber and having one side exposed to the liquid;
 a pilot diaphragm in said chamber having one side exposed to the liquid;
 a surge tank;
 a gas conduit system coupling said surge tank to the other side of said main diaphragm and said pilot diaphragm;
 a bleeder nozzle coaxial with said pilot diaphragm and arranged to exhaust gas from said conduit system in accordance with the spacing between the center of said pilot diaphragm and the end of said nozzle;
 a gas input conduit;
 an orifice coupling said input conduit to said gas conduit system for supplying gas thereto at the rate at which it escapes from said nozzle; and
 a pneumatic relay coupled in said input conduit to regulate the flow therethrough and coupled to said conduit system to be regulated thereby, whereby an increase in pressure of the liquid moves said main diaphragm to allow expansion thereof and to thereby absorb a major portion of the surge and moves said pilot diaphragm to restrict the gas flow from said nozzle, resulting in an increase in the pressure within said conduit system, a change of the regulation of said pneumatic relay to increase the flow rate through said orifice and thus return both of said diaphragms toward their neutral positions.

6. A pneumatic pulsation dampener in accordance with claim 5 wherein the compressible fluid capacity of said gas conduit system, said surge tank and said chamber are sufficient to allow substantial flexing of said main diaphragm with pressure variations of said liquid so that liquid pressure surges are reduced to less than about five percent of the initial magnitude during passage of the liquid through said chamber; and the flow rate of gas through said input conduit is sufficient to establish a stable pressure within said gas conduit system within about a second for liquid pressure changes of about five percent or less.

7. A pneumatic pulsation dampener for regulating flow of a noncompressible liquid, comprising:
 a conduit for conducting the liquid;
 a diaphragm chamber coupled in said conduit;
 a main diaphragm in said chamber and having one side exposed to the liquid;
 a pilot diaphragm in said chamber having one side exposed to the liquid;
 a surge tank;
 a gas conduit system coupling said surge tank to the other side of said main diaphragm and said pilot diaphragm;
 a bleeder nozzle coaxial with said pilot diaphragm and arranged to exhaust gas from said conduit system in accordance with the spacing between the center of said pilot diaphragm and the end of said nozzle;
 a gas input conduit; and
 an orifice coupling said input conduit to said gas conduit system for supplying gas thereto at the rate at which it escapes from said nozzle whereby an increase in pressure of the liquid moves said main diaphragm to allow expansion thereof to thereby absorb a major portion of the surge and moves said pilot diaphragm to restrict the gas flow from said nozzle, resulting in an increase in the pressure within said gas conduit system to thus return both of said diaphragms toward their neutral positions.

8. A pneumatic pulsation dampener for regulating flow of a noncompressible liquid through a conduit, comprising:
- a main diaphragm having one side exposed to the liquid flowing through the conduit;
- a pilot diaphragm having one side exposed to the liquid;
- a gas conduit coupling the other sides of said main diaphragm and said pilot diaphragm;
- a bleeder nozzle coaxial with said pilot diaphragm and arranged to exhaust gas from said gas conduit system in accordance with the spacing between said pilot diaphragm and the end of said nozzle;
- a gas input conduit; and
- an orifice coupling said input conduit to said gas conduit system for supplying gas thereto at the rate approximating that at which gas escapes from said nozzle whereby an increase surge in pressure of the liquid moves said main diaphragm to allow expansion thereof to thereby absorb a major portion of the surge and moves said pilot diaphragm to restrict the gas flow from said nozzle, resulting in an increase in the pressure within said gas conduit system to thus return both of said diaphragms toward their neutral positions.

References Cited by the Examiner
UNITED STATES PATENTS

| | | | |
|---|---|---|---|
| 2,949,932 | 8/1960 | Hewitt | 138—30 |
| 3,103,234 | 9/1963 | Washburn | 138—30 |

M. CARY NELSON, *Primary Examiner.*

W. CLINE, *Assistant Examiner.*